United States Patent Office 3,475,251
Patented Oct. 28, 1969

---

3,475,251
ADHESION IMPROVEMENT OF TIRE CORD TO RUBBER BY GRAFT POLYMERIZATION WITH p-VINYLPHENYLTHIOLACETATE
Hans Widmer, Akron, Ohio, assignor to The Goodyear Tire & Rubber Company, Akron, Ohio, a corporation of Ohio
No Drawing. Filed Aug. 10, 1966, Ser. No. 571,437
Int. Cl. B32b *25/10;* C08f *29/56*
U.S. Cl. 156—334                    7 Claims

ABSTRACT OF THE DISCLOSURE

Adhesion between rubber and polymeric reinforcing agents (such as tire cord) is improved by grafting special sulfur-containing vinyl monomers to the reinforcing agent. After grafting, these monomers can be hydrolyzed to yield sulfhydryl groups which are reactive toward rubber. Adhesion between rubber and the reinforcing agent is greatly improved by inducing reaction of the sulfhydryl group and the rubber. An example of the class of monomers to which the invention applies is p-vinylphenylthiolacetate.

---

This invention relates to graft polymerizing monomers onto polymers to improve the ability of the polymer to be bonded to elastomeric materials. More particularly, it relates to graft polymerization wherein the grafted side chains may be hydrolized to produce a high concentration of reactive sulfhydryl groups thereon which may form chemical bonds with elastomers.

There are many applications of elastomeric materials which require reinforcement. Examples of such products are pneumatic tires, hose, sheeting, belting, etc. Reinforcing materials should have certain well understood physical properties such as chemical and thermal resistance, tensile strength, flexibility, etc. However, the reinforcing material must also be capable of bonding tenaciously to the elastomer. Poor adhesion results in separation of the elastomer and reinforcing material and loss of part or all of the reinforcing function. A number of methods have been suggested to improve the adhesive characteristics of those reinforcing materials which have good physical properties.

These suggestions have included, among others, graft polymerization of assorted monomers onto polymeric reinforcing materials. It has also been suggested to incorporate sulfhydryl groups onto the polymer backbone by direct application of hydrogen sulfide since sulfhydryl groups are known to form a chemical bond with rubber. This latter method produced only a very low concentration of active sulfhydryl groups on the polymer.

Applicant has now discovered a method of greatly improving the adhesion between presently known elastomers and plastic reinforcing materials by producing a high concentration of sulfhydryl groups on said reinforcing material. The novel method of the invention comprises:

(1) Graft polymerizing to the reinforcing material a monomer of the general formula:

(A)                    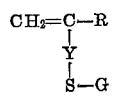

wherein:

R represents —H, —CH$_3$ or —C$_2$H$_5$
Y represents (—CH$_2$—)$_n$ or phenylene (o, m, p)
n represents an interger from 0 through 3
G represents

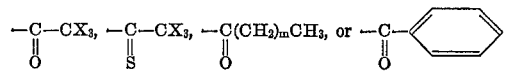

X represents —H, —F, or —Cl, and
m represents an interger from 1 through 18.

(2) Hydrolyzing the grafted polymer to form sulfhydryl groups thereon, and
(3) Forming a chemical bond between said reinforcing material and said rubber by chemical or thermal activation.

MONOMER

The monomer to be graft polymerized onto the polymer in the practice of this invention is a monomer of the general formula:

(A)                    

wherein R, Y, and G represent the values set forth above.

Examples of of these monomers suitable for the practice of the invention are vinylthiolacetate, para-vinylphenylthiolacetate, and allylthiolacetate.

POLYMERS

Any of the know plastic reinforcing materials can be employed in the practice of the invention. The invention is, however, especially useful with saturated polyester resin fibers which are the most recent entry in the elastomer reinforcing field. In addition to the polyesters, such reinforcing materials would include polyolefins (polyethylene, polypropylene, polyisobutylene), polyamides (nylon, wool), polyurethanes, and polyvinyls (polystyrene, polyacrylonitrile, polyvinylchloride, polyvinylidenechloride, polyvinylacetate and polymethylmethacrylate).

ELASTOMERS

The invention is useful with all known natural and synthetic elastomers. This would include among others natural rubber, cis polyisoprene, polybutadiene, GR–S and GR–N polymers. However, it is to be observed that the Goodyear U-adhesion test [Tester and test procedure available from Scott Testers, Inc., Providence, R.I.] demonstrates that the adhesion achieved by the method described varies with the particular rubber stock. For example, the adhesion improvement to natural rubber is about 30% less than that obtained with a rubber blend containing natural rubber, styrene butadiene copolymer and cis-1,4-polybutadiene.

GRAFT POLYMERIZATION TECHNIQUE

The graft polymerization utilized in the practice of this invention may be conducted by conventional techniques well understood in this art. It may be initiated by either radiation or chemical procedures. Where irradiation polymerization is initiated, the peroxidative, contact, or trapped radical method may be employed. The preferred method of grafting considering the grafting yield, physical properties of the grafted cord, and commercial viewpoint is the trapped radical method where the cord is irradiated and subsequently contacted with the monomer in gass or liquid phase. The radiation graft polymerization techniques are well known in the art. Procedural details are described in the literature, as for examples, see: Adolph Chapiro, "Radiation Chemistry of Polymerica Systems High Polymers," vol. XV, p. 598ff; and S. H. Pinner and V. Wycherly, "Plastic," (London) 22, 503 (1957). Likewise the techniques of chemical graft polymerization are well understood in the art and the details may be observed by reference to W. J. Burlant and Allen S. Hoffman "Block and Graft Polymers," Reinhold Publishing Company, N.Y. (1960), pp. 1429, pp. 53–61.

HYDROLYSIS

Because of the ease of oxidation of sulfhydryl groups, hydrolysis is preferably accomplished in the absence of air. This may be satisfactorily achieved, for example, by refluxing the grafted fiber in a 50:50 methanol-water solution and subsequently washing with air-free water until the washings are neutral to litmus. If desired the fiber may then be washed with acetone and dried under vacuum. In the case of polyester grafts, hydrolysis is preferably achieved under milder conditions than those suggested here so that the polyester backbone is not injured by the hydrolysis.

The relative reactivity of the sulfhydryl group is dependent on the rubber employed. This reactivity may be determined for any given rubber composition by conventional laboratory experimentation. The reactivity is further dependent on the electron supplying groups in the thiol (i.e. Y in the general Formula A above). Thus, the reactivity of the sulfhydryl group may be increased by incorporating a more active electron supplying group in the monomer molecule being grafted. As can be seen by comparing Tables I and II, the sulfhydryl group, when activated by a phenylene group, reacts chemically in a most satisfactory manner without any assistance during the vulcanization step.

When vinylthiolacetate is employed as the grafted monomer, it is preferred, for best results, to employ a sulfhydryl-rubber crosslink activator. These are well known in the art. A typical one is benzoyl peroxide which can be used as a 10% solution in acetone.

The invention is illustrated but not limited by the following examples wherein the terms in quotation marks represent the indicated materials which were employed in the actual experiments:

"Polypropylene" — Prolene Cont. Fil. Yarn, Hercules Powder Co., 840 denier/2 ply, 13/13 twist
"Polyamide" — 66 nylon T–714 tire cord, Du Pont 840 denier/2 ply, 12/12 twist
"Polyester" — Dacron T–68 RO2 tire cord, Du Pont 1100 denier/2 ply, 11/11 twist
"Rubber stock A" — 55% natural rubber and 45% styrene butadiene copolymer
"Ruber stock B" — 50% natural rubber, 20% styrene butadiene copolymer, and 30% polybutadiene rubber
"Ruber stock C" — 100% natural rubber

EXAMPLE 1.—GRAFTING POLYPROPYLENE, POLYAMIDE AND POLYESTER WITH VINYLTHIOLACETATE 1.1 Trapped radical method, followed by contact with monomer in liquid phase Polypropylene, polyamide, and polyester specimens were irradiated in evacuated ampoules at a dose rate of 0.6 mrad/hr. to a total dose of 2 mrad at −196° C. Afterwards the cords were contacted at 100° C. for 15 hours with vinylthiolacetate. Grafts to the extents of 1%, 1% and 5% were achieved respectively.

1.2 Trapped radical method, folowed by contact with monomer vapor

Polypropylene, polyamide, and polyester were pre-irradiated at a dose rate of 0.2 mrad/hr. to a total dose of 2 mrad at −196° C. The cord was subsequently contacted with monomer gas at 100° C. A 9% graft on polyester and polyamide and a 5% graft on polypropylene tire cords were achieved. All cords were flexible after the grafting operation.

1.3 Contact grafting in gas phase

Polypropylene, polyamide and polyester specimens were sealed under vacuum in glass ampoules containing vinylthiolacetate at the bottom, and irradiated at a dose rate of 0.1 mrad/hr. for 16 hrs. The contact of the fiber with the monomer vapor took place only during irradiation at 100° C. Grafts of 6%, 3% and 2% were achieved respectively.

EXAMPLE 2.—GRAFTING POLYPROPYLENE, POLYAMIDE, AND POLYESTER WITH p-VINYLPHENYLTHIOLACETATE 2.1 Trapped radical method, followed by contact with monomer in liquid phase Polypropylene, polyamide and polyester specimens were irradiated in evacuated ampoules at a dose rate of 0.6 mrad/hr. to a total dose of 2 mrad at −196° C. The cords were contacted afterwards with vinylphenylthiolacetate liquid at 100° C. for 15 hours. Grafts of 10%, 5% and 6% were obtained respectively.

2.2 Contact grafting in liquid phase

Polypropylene, polyamide, and polyester specimens weare sealed under vacuum into glass ampoules con-dose rate of 0.1 mrad/hr. for 16 hours. The contact of the fiber with the monomer liquid took place only during irradiation with the monomer liquid at 100° C. Grafts on 20%, 13% and 10% were achieved respectively.

2.3 Peroxidative grafting

Polypropylene, polyamide, and polyester specimens were irradiated in the presence of air at a dose rate of 0.1 mrad/hr. for 10 hours at 23° C. The cords were then contacted anaerobically with monomer at 100° C. for one hour. Grafts of 2%, 1% and 3.6% were achieved respectively.

EXAMPLE 3.—CHEMICAL GRAFTING APPLYING THE HYDROPEROXIDATION METHOD

Polypropylene, polyamide and polyester were ozonized at 100° F. (50 p.p.h.m. ozone) for 4 and 48 hours, and then contacted anaerobically with the liquid p-vinylphenylthiolacetate monomer at 120° C. Gratfs of 2%, 3% and 15% were achieved respectively.

PHYSICAL PROPERTIES OF GRAFTED CORD AND ADHESION IMPROVEMENT

Adhesion tests were run by Goodyear U-adhesion test, using rudbber stocks A, B and C. Approximately eight individual tests per graft were made at room temperature with each rubber stock. Cures of 15 minutes at 300° F. were used. Strength, elongation, and contraction force were measured with an Instron tester. The physical test data are shown in Tables I and II. The Goodyear U-adhesion tests refer to adhesion with rubber stock B.

TABLE I.—GRAFTING VINYLTHIOLACETATE BY VARIOUS METHODS ONTO TIRE CORDS

| Description of Cord Treatment | Polypropylene | | | | | Polyamide | | | | | Polyester | | | | |
|---|---|---|---|---|---|---|---|---|---|---|---|---|---|---|---|
| | Graft Yield, Percent | U-Adhesion Test, lbs. | Tensile Strength, lbs. | Elongation, Percent | Temp. at Break, °C. | Graft Yield, Percent | U-Adhesion Test, lbs. | Tensile Strength, lbs. | Elongation, Percent | Temp. at Break, °C. | Graft Yield, Percent | U-Adhesion Test, lbs. | Tensile Strength, lbs. | Elongation, Percent | Temp. at Break, °C. |
| Cord treated for 15 hrs. at 100° C. with monomer, without radiation (control) | | 6 | 21 | 24 | 367 | | 6 | 30 | 18 | 490 | | 6 | 35 | 16 | 500 |
| Cord irradiated with 2 Mrad (0.6 Mrad/hr.) and heat treated for 15 hrs. at 100° C. (control) | | 6 | 21 | 25 | 364 | | 6 | 30 | 18 | 494 | | 6 | 33 | 17 | 500 |
| Contact graft in gas phase Example I. 3 | 6 | 6 | 20 | 26 | 358 | 6 | 6 | 28 | | 500 | 2 | 6.5 | 32 | | 498 |
| Hydrolyzed | | 7 | | | | | 6.5 | | | | | 7.0 | | | |
| Hydrolyzed and peroxidized | | 10 | | | | | 10 | | | | | 8.5 | | | |
| Trapped radical graft Example I.1 | 1 | 6 | 21 | 24 | 359 | 1 | 6 | 30 | 17 | 495 | 0.5 | 7.5 | 34 | 17 | 500 |
| Hydrolyzed and peroxidized | | 9 | | | | | 9 | | | | | 17 | | | |
| Cord treated with conventional resorcinol-formaldehyde adhesives | Cord decomposed during treatment | | | | | | 21.5 | | | | | | | | |

TABLE II.—GRAFTING OF p-VINYLPHENYLTHIOLACETATE BY VARIOUS METHODS ONTO TIRE CORDS

| Description of Cord Treatment | Polypropylene | | | | | Polyamide | | | | | Polyester | | | | |
|---|---|---|---|---|---|---|---|---|---|---|---|---|---|---|---|
| | Graft Yield, Percent | U-Adhesion Test, lbs. | Tensile Strength, lbs. | Elongation, Percent | Temp. at Break, °C. | Graft Yield, Percent | U-Adhesion Test, lbs. | Tensile Strength, lbs. | Elongation, Percent | Temp. at Break, °C. | Graft Yield, Percent | U-Adhesion Test, lbs. | Tensile Strength, lbs. | Elongation, Percent | Temp. at Break, °C. |
| Trapped radical graft Example 2.1 | 10 | 6 | 18 | 26 | 358 | 5 | 6 | 29 | 18 | 484 | 6 | 5.5 | 31 | | 498 |
| Hydrolyzed | | 13 | | | | | 11 | | | | 1 | 12 | | | |
| Hydrolyzed and peroxidized | | 13 | | | | | 12 | | | | | 12 | | | |
| Contact graft in liquid phase, Example 2.2 | 20 | 6 | 14 | 23 | 360 | 13 | 6 | 21.5 | 18 | 494 | 10 | 6 | 28 | 15 | 494 |
| Hydrolyzed | | 13 | | | | | 12 | | | | | 13 | | | |
| Chemical graft by the peroxidation method of Example 3, hydrolized | 2 | 11 | 21 | 28 | 352 | 3 | 13 | 26 | 21 | 402 | 15 | 13.5 | 10 | | 465 |

NOTE.—Control measurement are presented in Table 1: U-ad. test error limits on graft experiments and controls ±1 lb. U-ad. test error limits on cord, treated with resorcinol-formaldehyde adhesives ±3 lbs.

The percentage increase in Goodyear U-adhesion test achieved by grafting p-vinylphenylthiolacetate as described in Example 2.2 is presented in Table III for the rubber stocks A, B and C.

TABLE III.—GRAFTING OF p-VINYLPHENYLTHIOLACETATE TO VARIOUS RUBBER STOCKS

| Tire Cord | Rubber stock A and B | | | Rubber stock C | | |
|---|---|---|---|---|---|---|
| | Adhesion Control, lbs. | Adhesion, lbs. | Percent Increase | Adhesion Control, lbs. | Adhesion, lbs. | Percent Increase |
| Polypropylene | 13 | 6 | 120 | 8.5 | 5 | 70 |
| Polyamide | 12 | 6 | 100 | 8 | 4.5 | 80 |
| Polyester | 13 | 6 | 120 | 9 | 5 | 80 |

Physical tests demonstrate that tire cords grafted with p-vinylphenylthiolacetate monomer show, after hydrolyzation, an increase in adhesion of about 100% when adhered to standard tire carcass rubber. The improvement of adhesion is significant for graft yields higher than 1% and reaches a maximum at about 5%. The tensile loss for a 5% graft in all three different cords does not exceed 10% but increases markedly for grafts greater than 10%. For polypropylene cord the temperature at break under 5 lbs. load drops only about 2% with up to 20% graft. No significant deterioration is observed with polyamide and polyester cords. The elongation of the cord can be maintained if the cord is stretched after the neutralization process. Considering all the physical properties, the optimum graft lies somewhere between 5% and 10%. The cords grafted with the radiation or chemical peroxidation method show a more extensive degradation of the heat resistance and, to some extent the tensile properties.

Having provided a complete description of the inven-

I claim:
1. A method for improving the adhesion between a plastic reinforcing material and rubber which comprises:
(1) graft polymerizing to said reinforcing material selected from the group consisting of polyesters, polyamides, polyurethanes, polyvinyls and polyolefins a monomer of the general formula

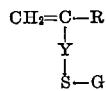

wherein:
R represents —H, —CH$_3$ or —C$_2$H$_5$
Y represents (—CH$_2$—)$_n$ or phenylene (o, m, p)
n represents an integer from 0 through 3
G represents

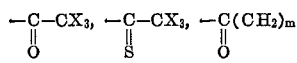

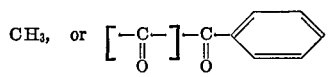

X represents —H, —F, or —Cl and
m represents an integer from 1 through 18

(2) hydrolyzing the grafted polymer to form sulfhydryl groups thereon, and
(3) forming a chemical bond between said reinforcing material and said rubber by means of chemical or thermal activation.

2. The method according to claim 1 wherein the plastic reinforcing material is a saturated polyester fiber.

3. The method according to claim 1 wherein the plastis reinforcing material is a polyamide fiber.

4. The method according to claim 1 wherein the plastic reinforcing material is a polyolefin fiber.

5. The method according to claim 1 wherein the grafted monomer is vinylthiolacetate.

6. The method according to claim 1 wherein the grafted monomer is p-vinylphenylthiolacetate.

7. The method according to claim 1 wherein the grafted monomer is allylthiolacetate.

References Cited
UNITED STATES PATENTS

| | | | |
|---|---|---|---|
| 2,346,440 | 4/1944 | Lessig | 161—187 X |
| 2,782,139 | 2/1957 | Hill | 156—110 |
| 2,877,214 | 3/1959 | Opheim, et al. | 260—79.7 |
| 2,906,741 | 9/1959 | Hwa | 260—79.7 |
| 3,157,564 | 11/1964 | Tucker et al. | 156—334 X |
| 3,166,608 | 1/1965 | Natta et al. | 260—878 |
| 3,215,677 | 11/1965 | LeFaye et al. | 260—79.7 X |
| 3,274,294 | 9/1966 | Stanton et al. | 260—873 |
| 3,297,786 | 1/1967 | Horowitz | 260—878 |
| 3,310,605 | 3/1967 | Marans et al. | 260—878 |
| 3,338,769 | 8/1967 | Kuhlkamp et al. | 156—334 |
| 3,340,326 | 9/1967 | Faessinger | 260—857 |
| 3,386,974 | 6/1968 | Ourguad | 260—79.7 |
| 3,387,996 | 6/1968 | Tolliver | 117—138.8 |

HAROLD ANSHER, Primary Examiner

C. B. COSBY, Assistant Examiner

U.S. Cl. X.R.
117—76, 138.8; 152—330; 156—110, 338; 161—187, 260—79, 857, 873, 898

PO-1050
(5/69)

UNITED STATES PATENT OFFICE
CERTIFICATE OF CORRECTION

Patent No. 3,475,251     Dated October 28, 1969

Inventor(s) Hans Widmer

It is certified that error appears in the above-identified patent and that said Letters Patent are hereby corrected as shown below:

Column 2, line 14, "interger" should be -- integer --; line 41, "know" should be -- known --. Column 3, line 12, "gass" should be -- gas --; line 16, "merica" should be -- meric --. Column 4, line 41, "weare" should be -- were --. line 41, the following should be inserted after "con-": -- taining p-vinylphenylthiolacetate and irradiated at a --; line 62, "Gratfs" should be -- Grafts --; line 69, "rudbber" should be -- rubber --. Column 8, line 2, "tis" should be -- tic --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents